Nov. 5, 1963  L. T. SKEGGS  3,109,714
MEANS FOR SEPARATING FLUIDS FROM EACH OTHER
Filed July 22, 1959
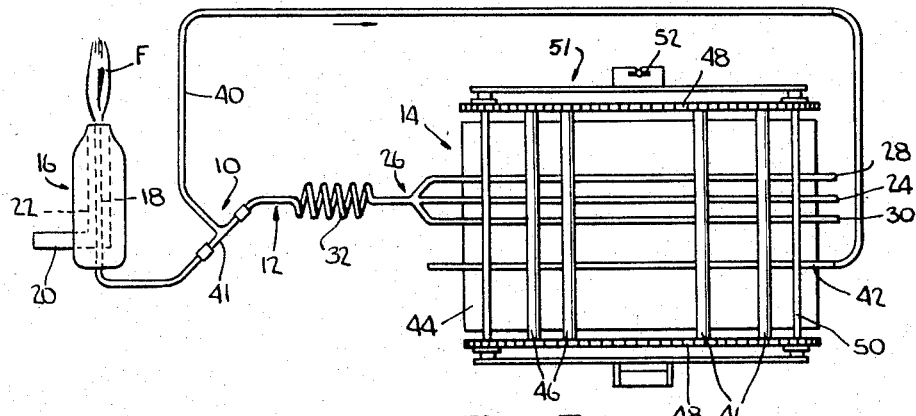
Fig. 1.
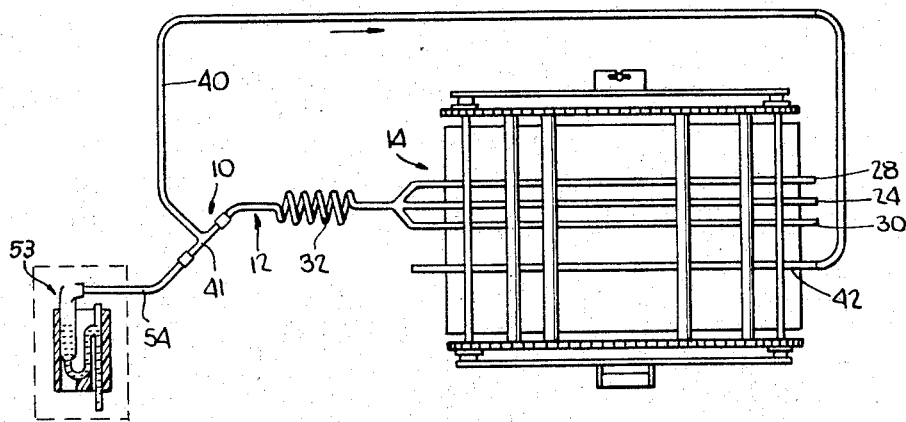
Fig. 2.
Fig. 3.
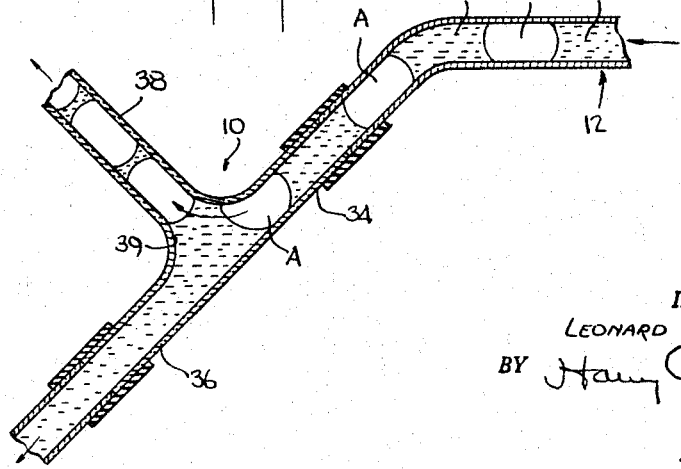
INVENTOR.
LEONARD T. SKEGGS
BY
ATTORNEY

3,109,714
MEANS FOR SEPARATING FLUIDS FROM EACH OTHER

Leonard T. Skeggs, Cleveland, Ohio, assignor to Technicon Instruments Corporation, Chauncey, N.Y., a corporation of New York
Filed July 22, 1959, Ser. No. 828,810
2 Claims. (Cl. 23—253)

This invention relates to means for separating one fluid from another during the flow of a stream of the fluids.

The invention is especially useful for abstracting air from an air-segmented liquid stream in analysis or other apparatus of the type disclosed in my U.S. Patents Nos. 2,797,149 and 2,879,141 in which provision is made for introducing air into a liquid stream and between streams of different liquid samples transmitted in succession through tubular passage for various treatments of the liquid or liquids for colorimetric examination. The removal of the air segments or bubbles before the liquid enters the flow cell of the colorimeter prevents foaming of the liquid; also, the liquid segments are consolidated into a continuous liquid stream for flow through said cell for proper operation of the colorimeter and the recorder. As explained in said patents, the air is injected into the liquid streams to provide a cleansing action on the walls of the tubular passages and to separate the successive liquid samples from each other.

The invention is also useful in conjunction with spectral flame burners wherein a liquid is aspirated or pumped into a flame for analysis in respect to a substance in the liquid, for example, sodium, potassium, magnesium, etc., in the examination of blood or other body fluids, or more generally in the analysis of various other liquids, for example in industrial processes. In the case of spectral flame burners, it is desirable to remove the liquid-segmentizing air from the liquid before the liquid enters the burner whereby to obviate sputtering or other irregularities in or undesirable effects on the flame due to the presence of air bubbles in the liquid.

The above and other objects, features and advantages of the present invention will be fully understood from the following description considered in connection with the accompanying illustrative drawings in which:

FIG. 1 is a more or less schematic view of apparatus of the present invention for use with a spectral flame burner;

FIG. 2 is a view similar to FIG. 1, illustrating the apparatus in conjunction with a colorimeter; and FIG. 3 is an enlarged sectional view of part of the apparatus of the invention.

Referring now to the drawings in detail and first to FIGS. 1 and 3, the apparatus of the present invention comprises a fitting 10 interposed in the fluid line 12 leading from the pump 14 to the spectral flame burner 16 of a spectrometer analyzer. As the burner itself is not part of the invention and may be of any suitable type, a detailed description thereof is of course unnecessary. However, as illustrated, it will be noted that the liquid under investigation is transmitted through the tube 18 into the flame F and that the fuel and air for the flame are introduced at the inlet 20 and flow upwardly through the tube 22 to the burner tip.

As illustrated in FIG. 3, the fluid stream as it flows in line 12 from the pump 14 is composed of segments of liquid L with intervening segments A of air, which is introduced by way of the pump tube 24 at the fitting 26 where the liquid under analysis and a processing liquid are introduced by way of the pump tubes 28 and 30, respectively. The outlet of fitting 26 is connected to a helical mixing coil 32, in fluid line 12, where the liquids are mixed with each other in each separated segment L.

The fitting 10 comprises inlet part 34, outlet part 36, and intermediate offtake part 38 which is disposed transversely of part 36 and which extends upwardly of the fitting and is connected by a tube 40 to the pump tube 42. Inlet part 34 and outlet part 36 are in axial alignment. It is to be noted that the internal walls of the inlet and outlet parts form cylinders and do not converge or diverge so that the velocity of the fluids passing through said parts does not change. Parts 34, 36 and 38 are hollow cylinders. When the fluid stream enters inlet part 34, the air segments or bubbles A flow upwardly into offtake part 38, through the opening 39, along with small quantities of the liquid segments, while liquid free of air and in the form of a continuous liquid stream flows from outlet part 36 of the fitting downstream of opening 39 to the burner 16.

Pump 14 may be of any suitable type. As here shown it is a proportioning pump of the type described in U.S. Patent No. 2,893,324. Briefly described, this type of pump comprises a platen 44 and the pump tubes 24, 28, 30 and 42, which are resiliently compressible and are all simultaneously compressed progressively along their lengths against platen 44 by transverse pressure rollers carried by conveyor sprocket chains 48 which are driven by a shaft 50 actuated by a motor (not shown). Said chains 48 are carried by a frame 51 which is pivoted at 52 so that said pressure rollers can be moved to a retracted position out of engagement with the pump tubes for access to the latter when desired.

Referring to FIG. 2, the invention is illustrated in conjunction with the flow cell 53 of colorimeter analyzer. In this case, the continuous liquid stream flows from the outlet part 36 of fitting 10 and through a tube 54 to upper part of the flow cell. In other respects, the apparatus illustrated by FIG. 2 is the same as the apparatus illustrated by FIGS. 1 and 3.

The operation of the apparatus is obvious from the above description. It will be understood that the air tends to rise into the offtake 38 of the fitting 10 while the liquid flows past the opening 39 where the offtake communicates with the tubular passageway through which the stream flows. Accordingly, the air is aspirated through the offtake 38 by the suction effect of the pump, and the pump is operated so that the suction at offtake 38 is sufficient to remove all of the air with a minimum quantity of the liquid. As illustrated, the fitting 10 is disposed in the inclined part 41 of the fluid line 12, so that the tendency of the liquid to flow past the opening 39 to the point of delivery is thereby increased.

It will be understood that the processing of the liquid for analysis or other purposes is not part of this invention and as it will vary according to the treatment required or selected as most suitable for the liquid or purpose involved and is unnecessary to the comprehension of the invention, a description of a specific processing method is unnecessary. However, reference may be had to my above mentioned patents if detailed information of a particular process to which the present invention may be applied is desired.

It will be understood that while two applications of the invention have been described, these are not to be considered exhaustive of the uses to which the invention may be put, it being apparent from the present disclosure that the invention is useful not only for removing air deliberately introduced into a liquid stream, but also for removing air or other gas which may be present, for any other reason, in a stream of liquid. Also, it is within the scope of this invention to separate a lighter liquid, in the sense of its specific gravity, from a heavier liquid in a stream of said liquids of different specific gravities, where the lighter liquid tends to rise to a level above that of the heavier liquid. Further, as used in this description, the term air designates not only atmospheric air alone but any gas which is removable from a liquid stream according to the invention.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underying idea or principles of this invention within the scope of the appended claims.

What I claim is:

1. In a system for the treatment of a series of sample liquids for analysis wherein the sample liquids are transmitted one after the other in the form of a stream in a tubular passageway leading to an analyzer and are treated for analysis while in transit to the analyzer, means for pumping said liquid samples and a reagent through said tubular passageway for transmission of the treated liquid samples to the analyzer and for introducing air into said tubular passageway between successive samples to keep them separated from each other as they flow in said passageway and for introducing air into each liquid sample as it flows in said passageway for dividing each liquid sample of the flowing stream into segments separated from each other by intervening segments of air; means for thereafter removing said air from said tubular passageway before the treated liquid samples enter the analyzer, said air removing means comprising a tubular member having an inlet connected directly with said tubular passageway at a point upstream from the analyzer and downstream from the point of admission of the liquid samples and said air, said tubular member extending upwardly from said tubular passageway whereby the air in said tubular passageway rises directly therefrom into the inlet of said tubular member while the liquid samples flow in succession in said tubular passageway past said inlet of said tubular member therebelow for transmission of the treated liquid samples, in succession and devoid of air, to the analyzer, and means included in said pumping means for inducing the flow of air from said tubular member during the flow of air and the liquid samples in said tubular passageway.

2. In a system for the treatment of a series of sample liquids for analysis wherein the sample liquids are transmitted one after the other in the form of a stream in a tubular passageway leading to an analyzer and are treated for analysis while in transit to the analyzer, means for pumping said liquid samples and a reagent through said tubular passageway for transmission of the treated liquid samples to the analyzer and for introducing air into said tubular passageway between successive samples to keep them separated from each other as they flow in said passageway and for introducing air into each liquid sample as it flows in said passageway for dividing each liquid sample of the flowing stream into segments separated from each other by intervening segments of air; means for thereafter removing said air from said tubular passageway before the treated liquid samples enter the analyzer, said air removing means comprising a T-fitting including a first tubular part forming a flow-through part of said passageway and a second tubular part extending upwardly from said first tubular part and having an inlet in direct communication with said first tubular part, whereby the air introduced into said tubular passageway rises directly therefrom into said second tubular part while the liquid samples flow in succession through said first tubular part of said passageway for transmission of the treated liquid samples, in succession and devoid of air, to the analyzer, and suction means included in said pumping means for inducing the flow of air from said second tubular part during the flow of the liquid samples and air in said tubular passageway.

References Cited in the file of this patent

UNITED STATES PATENTS

| | | |
|---|---|---|
| 1,775,362 | Demarcus | Sept. 9, 1930 |
| 2,195,898 | Newton | Apr. 2, 1940 |
| 2,252,687 | Bassett | Aug. 19, 1941 |
| 2,539,549 | Rayburn | Jan. 30, 1951 |
| 2,693,196 | Hundley | Nov. 2, 1954 |
| 2,768,704 | Cronkhite | Oct. 30, 1956 |
| 2,797,149 | Skeggs | June 25, 1957 |
| 2,879,141 | Skeggs | Mar. 24, 1959 |
| 2,884,366 | Anderson et al. | Apr. 28, 1959 |

FOREIGN PATENTS

| | | |
|---|---|---|
| 559,998 | France | June 27, 1923 |
| 451,905 | Great Britain | Aug. 13, 1936 |
| 869,041 | Germany | Mar. 2, 1953 |